(12) United States Patent
Mořkovský

(10) Patent No.: US 10,678,921 B2
(45) Date of Patent: Jun. 9, 2020

(54) DETECTING MALWARE WITH HASH-BASED FINGERPRINTS

(71) Applicant: Avast Software s.r.o., Prague (CZ)

(72) Inventor: Libor Mořkovský, Křemže (CZ)

(73) Assignee: Avast Software s.r.o., Prague (CZ)

( * ) Notice: Subject to any disclaimer, the term of this patent is extended or adjusted under 35 U.S.C. 154(b) by 84 days.

(21) Appl. No.: 15/721,244

(22) Filed: Sep. 29, 2017

(65) Prior Publication Data

US 2018/0096149 A1 Apr. 5, 2018

Related U.S. Application Data

(60) Provisional application No. 62/402,800, filed on Sep. 30, 2016.

(51) Int. Cl.
| | |
|---|---|
| *G06F 21/56* | (2013.01) |
| *H04L 29/06* | (2006.01) |
| *G06F 11/30* | (2006.01) |
| *G06F 11/34* | (2006.01) |
| *G06F 21/52* | (2013.01) |

(52) U.S. Cl.
CPC .......... *G06F 21/566* (2013.01); *G06F 11/302* (2013.01); *G06F 11/3476* (2013.01); *G06F 21/52* (2013.01); *H04L 63/1416* (2013.01); *G06F 2201/86* (2013.01); *G06F 2221/033* (2013.01); *G06F 2221/034* (2013.01); *G06F 2221/2101* (2013.01)

(58) Field of Classification Search
CPC ..... H04L 63/1416; G06F 11/302; G06F 21/52
USPC .......................................................... 726/23
See application file for complete search history.

(56) References Cited

U.S. PATENT DOCUMENTS

| | | | |
|---|---|---|---|
| 9,202,047 B2 | 12/2015 | Gupta et al. | |
| 9,330,257 B2 | 5/2016 | Valencia et al. | |
| 2005/0132031 A1* | 6/2005 | Sailer | G06F 21/577 709/223 |
| 2012/0255012 A1* | 10/2012 | Sallam | G06F 21/52 726/24 |
| 2013/0276121 A1* | 10/2013 | Thomas | G06F 21/56 726/24 |
| 2014/0016706 A1* | 1/2014 | Yagnik | H04N 19/60 375/240.18 |

(Continued)

OTHER PUBLICATIONS

Bose et al., Behavioral Detection of Malware on Mobile Handsets, Proceedings of the 6th international conference on Mobile systems, applications, and services, Jun. 17-20, 2008, pp. 225-238, Association for Computing Machinery, New York, New York.

(Continued)

*Primary Examiner* — Teshome Hailu
(74) *Attorney, Agent, or Firm* — Erickson Kernell IP, LLC

(57) ABSTRACT

Detecting malware includes monitoring an event stream for an executable program, where the event stream includes a plurality of events such as API call events. A first plurality of hash values is determined for the event stream. In response to an occurrence of a trigger event in the event stream, the first plurality of hash values for the event stream can be compared with a second plurality of hash values that represents an event stream for a known malware executable. A determination can be made if a behavior represented by the first plurality of hash values is a permitted behavior based on the comparison.

33 Claims, 5 Drawing Sheets

(56) References Cited

U.S. PATENT DOCUMENTS

| | | |
|---|---|---|
| 2015/0082430 A1 | 3/2015 | Sridhara et al. |
| 2015/0082441 A1 | 3/2015 | Gathala et al. |
| 2015/0186641 A1* | 7/2015 | Cabrera ................ G06F 21/554 726/23 |
| 2015/0245215 A1* | 8/2015 | Murphy .................. H04W 4/70 726/4 |
| 2016/0103992 A1 | 4/2016 | Roundy et al. |

OTHER PUBLICATIONS

Shabtai et al., "Andromaly": a behavioral malware detection framework for android devices, Journal of Intelligent Information Systems, Feb. 2012, pp. 161-190, vol. 38, Issue 1, Springer US.

Burguera et al., Crowdroid: Behavior-Based Malware Detection System for Android, Proceedings of the 1st ACM workshop on Security and privacy in smartphones and mobile devices, Oct. 17, 2011, pp. 15-26, Association for Computing Machinery, New York, New York.

\* cited by examiner

DETECTING MALWARE WITH HASH-BASED FINGERPRINTS

CROSS-REFERENCE TO RELATED APPLICATIONS

This Application claims priority to U.S. Provisional Patent Application Ser. No. 62/402,800, filed on Sep. 30, 2016, entitled "Detecting Malware with Hash-Based Fingerprints," the entire disclosure of which is incorporated herein by reference.

FIELD OF INVENTION

The present invention relates generally to anti-malware technology, and more particularly, to the detection of malware by using hash-based fingerprints.

BACKGROUND

Malware, short for "malicious software," is software that can be used to disrupt computer operations, damage data, gather sensitive information, or gain access to private computer systems without the user's knowledge or consent. Examples of such malware include software viruses, trojan horses, rootkits, ransomware, etc. A common mechanism used by malware developers is to embed the malware into a file that is made to appear desirable to user, or is downloaded and executed when the user visits a web site. For example, malware may be embedded into a software application that appears legitimate and useful. The user downloads the file, and when the file is opened, the malware within the file is executed. A file that contains malware can be referred to as a malicious file.

Detection of malware in order to protect computing devices is of major concern. Recently, there have been many attempts to improve the detection of malware. One such attempt involves determining whether one file is similar to another file or if one data object is similar to another data object. For example, signature analysis, heuristic analysis, behavioral analysis, hash sum analysis, and cloud-based analysis are categories of such methodological approaches. While the signature and hash sum techniques are well-known methods of detection analysis, these techniques can fail to detect modified malware code. Heuristic analysis can attempt to generally detect new malware by statically analyzing files, but it can be ineffective in detecting obfuscated malware. Behavioral analysis often proves effective in detecting modified malware, but even known methods of this analysis have a number of shortcomings. For example, known behavioral analysis methods may cause reduced performance of the system. For these reasons, a need for an improved method for detecting malware, particularly without reducing system performance, exists.

SUMMARY OF INVENTION

The present invention relates generally to a system and method for detecting malicious software using hash-based fingerprints. In order to detect malicious software, a comparison of the properties of an executable program may be made with the properties of programs or files known to contain malware.

One embodiment of the present invention is directed to a method wherein the program being evaluated is executed on a computer system, which can include a single computing device or multiple computing devices connected through a network. The method can include the step of monitoring an event stream for the program, wherein the event stream includes a plurality of events. The events may include or relate to event data for Application Program Interface (API) calls made by the program being evaluated, for example. Information about the API calls can be converted into an event vector. A first fingerprint for the event stream can be calculated. The first fingerprint may comprise a plurality of hash values that represent a summary of the events in the event stream. The first fingerprint can be a fixed length fingerprint, where the length of the fingerprint is irrespective of the number of events in the event stream. The first fingerprint may be recalculated in response to a new event being added to the event stream. The plurality of hash values that make up a fingerprint can be determined according to a MinHash hashing method or algorithm. In one embodiment, a MinHash vector is produced, wherein each entry in the vector comprises one of K independent hash values calculated by K indepenendent hash functions applied to the event data for a single event. The step of calculating the first fingerprint may include grouping events in the event stream into a plurality of overlapping groups, wherein fingerprint is calculated based on a group of events. In response to an occurrence of a trigger event in the event stream, the first fingerprint can be compared with one or more second fingerprints, where the second fingerprints can be from a database of fingerprints associated with known malware. A trigger event may occur when one or more of the hash values of a fingerprint has a specified trigger value or trigger pattern. In one embodiment, the trigger event may occur when the lowest four bits of the resultant hash value are zero, for example. Subsequently, the first fingerprint can be analyzed in order to determine whether the behavior represented by the aggregated events is permitted. For example, a first fingerprint for an executing program can be compared to one or more second fingerprints associated with known instances of malware. In other words, the one or more second fingerprints may represent one or more programs known to contain malware. If the first fingerprint matches a second fingerprint associated with a known instance of malware, then the executing program may be designated as containing malware.

Another embodiment of the present invention relates to a non-transitory computer readable storage medium having a program stored thereon that is configured for analyzing whether an executable program on a computing device contains malware. The program on the computer readable storage medium is adapted for observing an event stream for the executable program being executed on the computing device. The event stream includes a plurality of events related to the executable program begin evaluated, for example, data relating to API calls made by the executable program. A first fingerprint representing a summary of the behavior for the event stream may be generated and compared to one or more second fingerprints, which represent behavior associated with one or more programs known to contain malware. Based on the comparison, a determination can be made as to whether a behavior represented by the first fingerprint is a permitted behavior.

A further aspect of the present invention relates to a system for detecting malicious software using a hash-based fingerprint. The system includes a computing system, which can include a single computing device or multiple computing devices connected through a network, and on which an executable program is executed. The system can further comprise a monitor or monitoring module, an aggregator or aggregating module, and a behavior analyzer or behavior analyzing module. The monitoring module is configured for monitoring an event stream for the executable program being evaluated, wherein the event stream comprises a plurality of events. The aggregating module can be configured for receiving and processing the events to generate a first fingerprint for the event stream. In one embodiment, the first fingerprint may include events of the event stream grouped into a plurality of overlapping groups, wherein the fingerprint is calculated based on a group of events. The behavior analyzing module can be configured for receiving the first fingerprint for the event stream and comparing the first fingerprint for the event stream with one or more second fingerprints. Again, the one or more second fingerprints may represent one or more programs known to contain malware. The behavior analyzing module may also be adapted for determining, based on the comparison, whether a behavior represented by the first fingerprint is a permitted behavior.

Other objects and features will be in part apparent and in part pointed out hereinafter.

BRIEF DESCRIPTION OF THE DRAWINGS

For a better understanding of the disclosure, reference may be made to the accompanying drawings in which.

DETAILED DESCRIPTION

Figure 1:
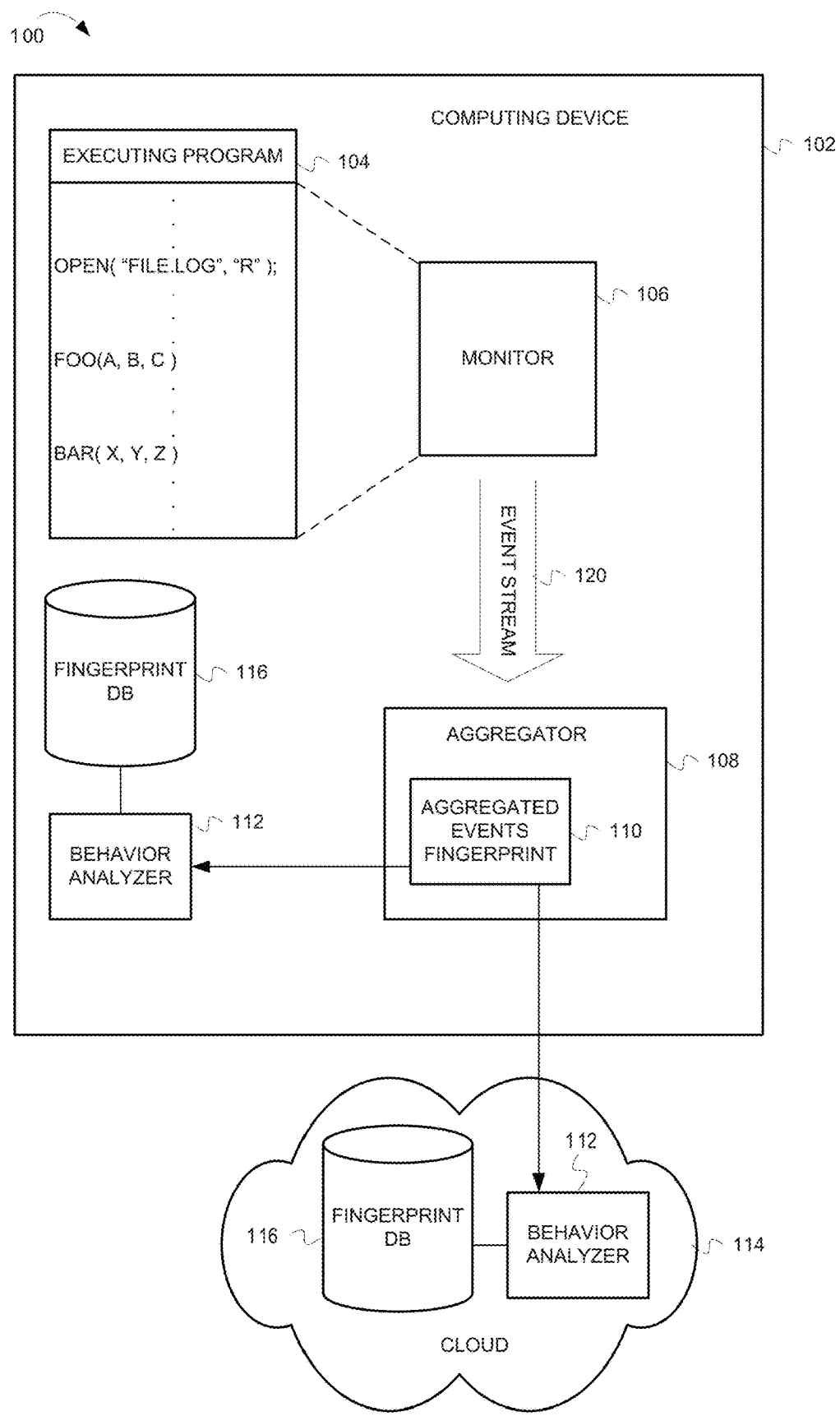
FIG. 1 is a block diagram illustrating a system for detecting malware using hash-based fingerprints in accordance with one embodiment of the present invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the figures, the same reference number is used throughout to refer to an identical component that appears in multiple figures. Signals and connections may be referred to by the same reference number or label, and the actual meaning will be clear from its use in the context of the description. In general, the first digit(s) of the reference number for a given item or part of the invention should correspond to the figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

The present invention is generally directed to systems and methods for detecting malware wherein at least one event stream is monitored and a fingerprint is produced that summarizes the behavior represented by events in the event stream. Events in the event stream(s) can include, for example, event data for Application Program Interface (API) calls such as Dynamic Link Library (DLL) calls, system calls, or calls into the Android Binder RPC interface that are made by an executable application, program or process. A fingerprint comprising a first plurality of hash values that represent an aggregation of the events in the event stream can be compared with fingerprints in a database containing fingerprints associated with known malicious behaviors. A determination can be made as to whether a behavior represented by the fingerprint is a permitted behavior. It will be appreciated that the plurality of hash values that comprise the fingerprints generated from the event stream and the fingerprints in the database can be generated through a MinHash hashing method.

FIG. 1 is a block diagram illustrating a system 100 for detecting malware using hash-based fingerprints in accordance with one embodiment of the present invention. In some aspects, the system 100 includes a computing device 102 and may optionally include a cloud system 114. In some aspects, the computing device 102 may be a personal computer. In alternative aspects, the computing device 102 may be a server computer, a laptop computer, a tablet computer, a smart phone, a set-top box, or any other device having a processor and memory enabling the device to execute programs. In the example shown in the FIG. 1, the computing device 102 can include an executing program 104, a monitoring module or monitor 106, an aggregating module or aggregator 108 and a behavior analyzing module or behavior analyzer 112.

The executing program 104 can be any type of program that can execute on the computing device 102. Examples include application programs, device drivers, operating system programs, etc. The embodiments are not limited to any particular type of executing program. In the example illustrated in FIG. 1, the executing program 104 can control API calls at various points in its execution: "open", "foo" and "bar". Each of the API calls can have various parameters supplied to them.

The monitor 106 can be a program that monitors other executing applications. For example, the monitor 106 can be an antivirus product that can prevent malware attacks from infecting the computing device. In some embodiments, the monitor 106 can monitor the executable program 104 and can determine a configuration setup for the executable program 104 controlling an API call. The monitor 106 can convert information about the API calls into an event. In another aspect of the present invention, the information about the event can include the name of the API function, and the arguments passed to the function. The monitor 106 can output event data for API calls made by an application while it executes over time. The output of the monitor 106 can be a sequence of events referred to as an event stream 120. In the example illustrated in FIG. 1, the event stream 120 can be streaming data resulting from the monitoring of the executing program 104. In some embodiments, the monitor 106 can be a pre-installed software package. Although described herein as monitoring for API calls, in alternative embodiments, the monitor 106 can monitor system level events other than API calls.

The aggregator 108 can receive an event stream and process the event data for the events in the event stream 120 to produce a fingerprint 110. The fingerprint 110 represents a set of aggregated events in the event stream 120. In some embodiments, data for the aggregated events can be converted into a fingerprint vector, where each entry in the vector represents an output of a hash function applied to the event data. For example, event data for an event can be processed using multiple hash functions to produce the entries in the vector for the event. The event vector can be aggregated with a vector representing previously aggregated events. The resulting vector comprises an aggregated events fingerprint 110 for the executing program 104. Thus, an unbounded stream of events associated with executing program 104 can be converted to a fixed length representation (i.e., fingerprint) for use in comparison with fingerprints associated with malware programs. In some embodiments, the aggregated events fingerprint 110 can be a vector having a fixed number of numeric values (e.g., integers). Thus, in some embodiments, the aggregated events fingerprint 110 has a fixed size irrespective of the number of events in the event stream.

The behavior analyzer 112 can receive the aggregated events fingerprint 110, and can compare the aggregated events fingerprint 110 for the executing program 104 with aggregated events fingerprints stored in a fingerprint database 116 that were created from programs known to contain malware. If the aggregated events fingerprint 110 is sufficiently similar to a previously determined aggregated events fingerprint for a known malware infected program, then the behavior analyzer 112 can determine that the executing program 104 contains malware. In some embodiments, a nearest neighbor query can be used to determine if the aggregated events fingerprint 110 is sufficiently similar to a fingerprint in fingerprint database 116 representing known malware.

In some embodiments, the aggregator 108 can choose to send the aggregated events fingerprint 110 to a behavior analyzer 112 that executes on a computing device 102, or to a behavior analyzer 112 that executes remotely from computing device 102, for example, on a cloud system 114. The choice of which behavior analyzer 112 to use can depend on the rate that events are received, network bandwidth, and the cloud computing resources available on the cloud system 114.

It should be noted that although the monitor 106, the aggregator 108, and the behavior analyzer 112 are shown as separate programs running on the computing device 102, any or all of them could be combined as components of a single program or system.

Figure 2:
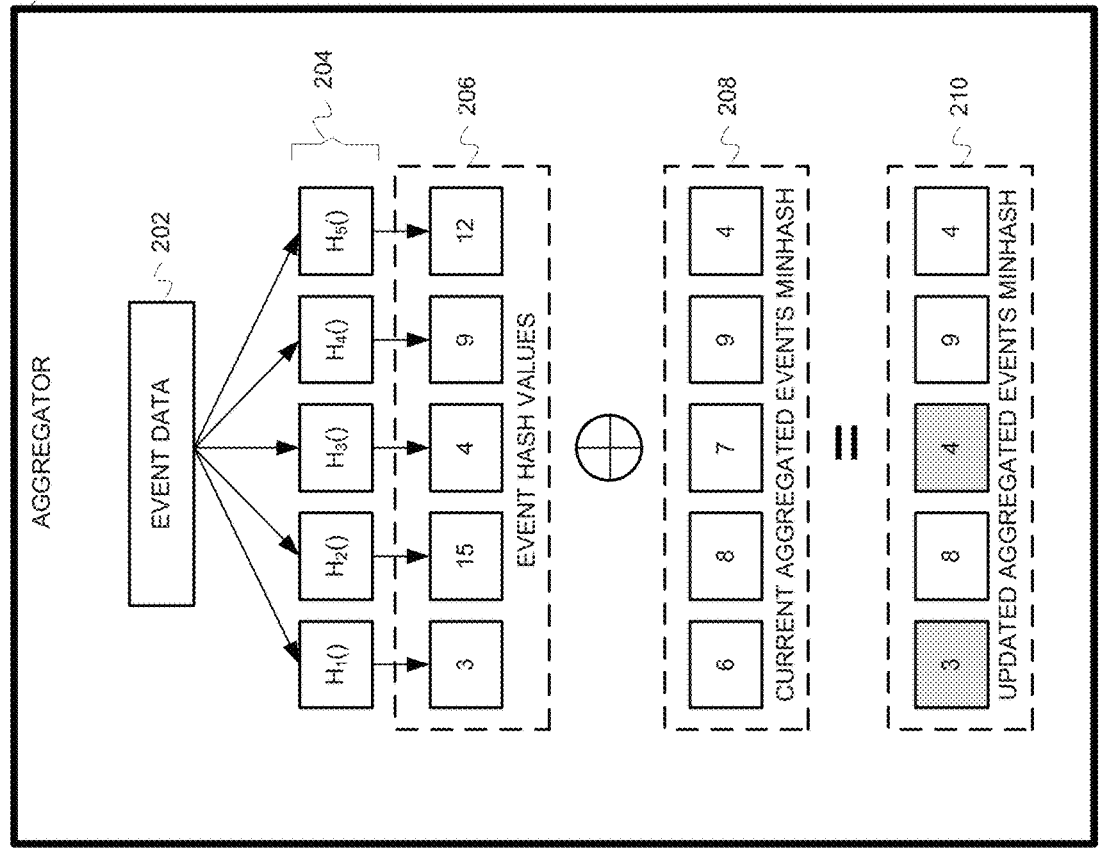
FIG. 2 is a block diagram illustrating an event stream including event data for API calls in accordance with one embodiment of the present invention.

FIG. 2 is a block diagram illustrating an event stream 120 including API calls in accordance with one embodiment of the present invention. In the example shown in FIG. 2, the event stream 120 includes three events such as, event 202A, event 202B and event 202C. The event 202A includes the event data for the "open" API call, the event 202B includes the event data for the "foo" API call, and the event 202C includes the event data for the "bar" API call of executing program 104 (FIG. 1).

The aggregator 108 receives the event stream 120 and creates an aggregated events fingerprint 110 from the received event stream. The aggregator 108 initializes an empty MinHash for an application 104. With each incoming event 202, the MinHash can be updated with a standard procedure (each event is the equivalent of a word in the document model of the MinHash algorithm). The MinHash is a hashing method of producing a vector of machine words representing an event stream in such a way that a Jaccard similarity of two documents is proportional to Hamming distance of their MinHashes. As an event 202 in the event stream 120 is received by the aggregator 108, it is hashed with K independent hash functions 204 to produce event hash values vector 206. The entries in event hash values vector 206 are compared with their respective entries in a current aggregated events MinHash vector 208, and the minimum value is retained in the updated aggregated events MinHash vector 210. Thus, after K hash functions have been performed, the result is a vector of K independent numbers. The updated aggregated events MinHash can be used as the current aggregated events MinHash vector 208 in the next iteration of the algorithm when a next event 202 is received from the event stream 120. Additionally, the updated aggregated events MinHash vector 210 can be used as the aggregated events fingerprint 110. In some embodiments, the K can be set to 200. However, other values could be used and are within the scope of the inventive subject matter. As more events occur, they are added to the event stream 120 and a new set of K independent numbers for event hash values vector 206 can be determined. An updated aggregated events MinHash vector 210 can then be determined using the MinHash hashing method on the event hash values and the current aggregated events MinHash vector 208.

For the example illustrated in FIG. 2, a value of K=5 is used. Those of skill in the art having the benefit of the disclosure will appreciate that other values can be used and are within the scope of the inventive subject matter. As noted above, in some embodiments, a value of K=200 is used. The event data 202 is provided to five hash functions H1-H5, producing event hash values vector [3, 15, 4, 9, 12]. The event hash values are compared with the current aggregated events MinHash vector 208 [6, 8, 7, 9, 4]. Because value 3 in the event hash values vector 206 is less than the value 6 in the corresponding position in the current aggregated events MinHash vector, it replaces the value 6 per the MinHash algorithm. Similarly, the value 4 in the event hash values vector 206 is less than the value 7 in the current aggregated events MinHash vector 208, and therefore replaces the value 7. This results in an updated aggregated events MinHash vector of [3, 8, 4, 9, 4], which can be used as a current aggregated events fingerprint 110.

In some embodiments, the aggregator 108 optionally utilizes a bMinHash compaction method. The bMinHash operates on a vector produced by MinHash to compact the hash values by keeping only a few lower bits of the original machine words in the MinHash hashing method. This can be desirable because it can result in saving memory space while retaining the desirable properties of the MinHash method. In some embodiments, the four lower bits of the original machine words output by the MinHash method are retained. In alternative aspects, the two lower bits can be maintained. The inventive subject matter is not limited to retaining any particular number of bits.

As noted above, the MinHash algorithm applies K independent hashing functions 204 to the event data. In some aspects, an Xxhash hashing function can be used for hash functions 204. The Xxhash function can be a fast hashing function with good hashing properties. To get K independent hashing functions, a vector of K random machine words can be generated. The vector can be distributed to all systems desiring to generate and analyze the hash-based fingerprint 110 of the present invention. Each event can be hashed once, for example, using Xxhash, and then K different values can be obtained by applying the XOR function to each value in the vector of random machine words to the hashed event value. While Xxhash can be desirable, other hashing methodologies can be used in alternative embodiments.

Figure 3:
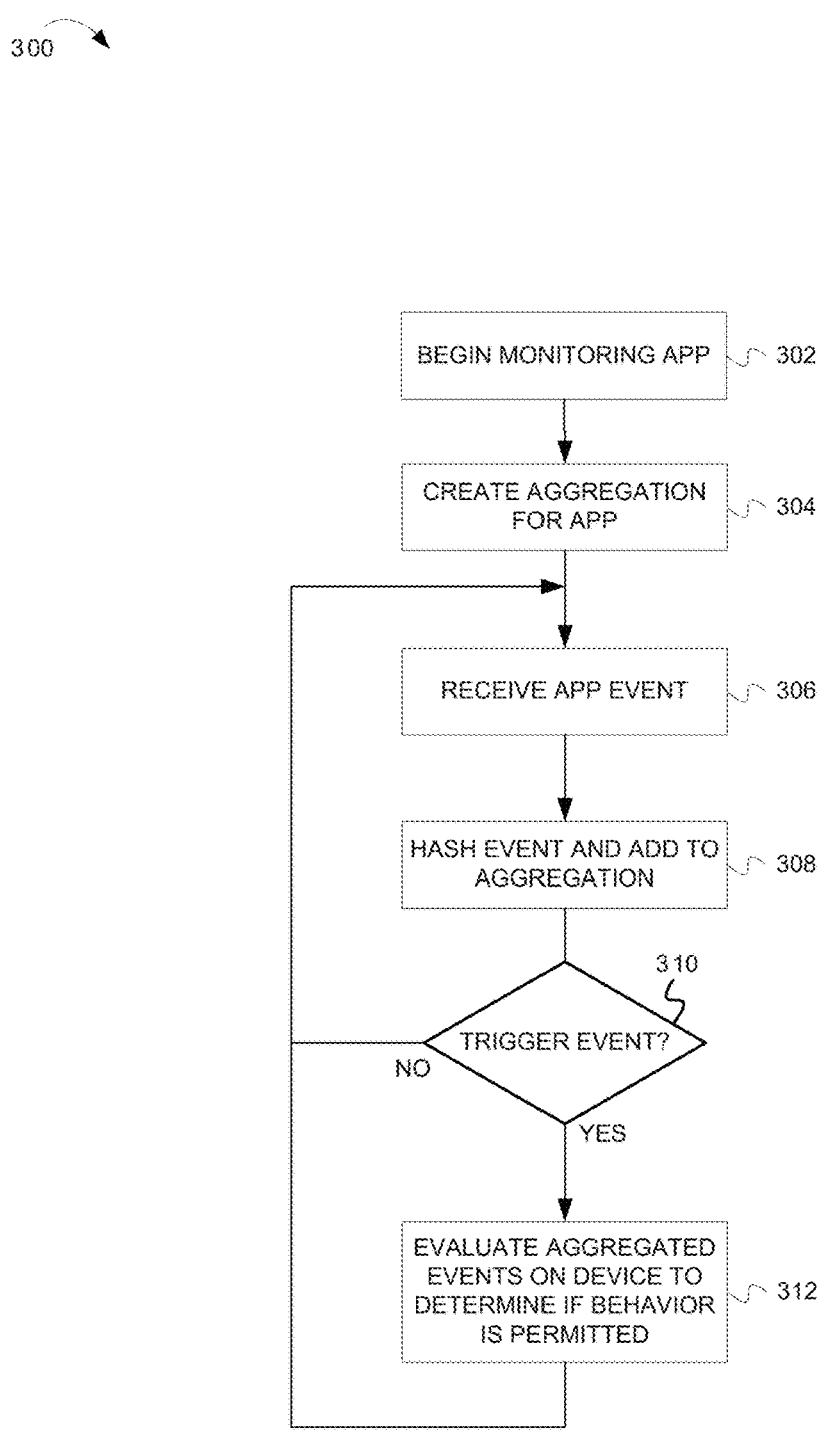
FIG. 3 is a flow chart illustrating a method for detecting malware using hash-based fingerprints in accordance with one embodiment of the present invention.

FIG. 3 is a flow chart 300 illustrating a method for detecting malware using hash-based fingerprints in accordance with one embodiment of the present invention. The method begins at block 302 by initiating the monitoring of API calls of the executing program 104. The program 104 may be executed on the computing device 102 and may be connected with other computing devices and the network systems. For example, the executing program 104 may interact with data of the system 100 stored in data servers or memories (not shown) that may be communicably accessed through the interaction. Thus, one embodiment of the present invention that monitors API calls can be controlled by an interaction among the data storage and a pre-installed software package.

At block 304, the aggregator 108 initializes the MinHash value as an empty status for the executing program 104.

At block 306, a new event of the event stream of the executing program 104 is received. In some embodiments, the new event comprises event data representing an API call controlled by the executing program 104. The MinHash value can be refreshed when each incoming event data is updated. In another aspect of the present invention, the system can generally include other system events such as file system events, network system events and the like, which may be used instead of, or in addition to, API calls. For example, in Android™ based systems, the system events can be binder transactions. Other examples of API calls include DLL functions in Microsoft Windows based platforms and system calls on Unix based platforms.

At block 308, the event data is submitted to multiple independent hash functions, and a resultant vector of hash values is combined with a vector of hash values representing a previously determined aggregated events fingerprint. In some embodiments, a MinHash vector can be used to produce the vector of hash values. In another embodiment of the present invention, a bMinHash algorithm can be applied to the MinHash vector to produce a more compacted hash value than that produced by the MinHash algorithm.

At block 310, it may be determined whether or not a trigger event has occurred. This may be used to evaluate a maliciousness of the behavior represented by the aggregated events fingerprint 110. An event can be a trigger event when one or more hash values in the vector of hash values making up a fingerprint has a trigger value or trigger pattern. The Minhash vector can be updated when an incoming event is refreshed. As noted above, a bMinHash vector can be generated from the MinHash. A special feature (i.e. a trigger) of the bMinHash vector can be presented if the lowest four bits of at least one of the K hash values are all zero. The method can be fine tuned by adjusting the number of hashes that are tested for the trigger event. This is desirable because it can provide determinism with respect to detecting triggers with respect to the event stream 120. For example, in embodiments where K=256, there are 256 levels for event triggering. If the aggregator 108 monitors the lowest 8 bits of a hash value, the probability of detecting a trigger can be scaled in increments of 1/256. The trigger event may occur when the lowest four bits of the resultant hash value are all zero. In another embodiment, other trigger values can be used, and such values are within the scope of the inventive subject matter. The frequency of the trigger event(s) can be tuned by selecting a frequency feature of the bMinHash. For example, when using the lower bits (e.g., the lowest four bits are all zero), each bit required to be zero means half of the frequency for an optimized decrease of the trigger event. By the nature of hashing functions, the bit settings in the hash value are typically random with respect to the input data.

If a trigger event has occurred at block 310, then the method proceeds to block 312. If a trigger event has not occurred, then the method returns to block 306 to receive further events to be added to the set of aggregated events for the executing application 104. For example, the fingerprint as determined at a first trigger may not represent malicious behavior. Subsequent events may cause the fingerprint to be updated to a fingerprint that does represent malicious behavior. As a result, fingerprints continue to be updated after triggers are detected.

At block 312, the current set of aggregated events (e.g., the event vector) can be analyzed in order to determine whether the behavior represented by the aggregated events is permitted. For example, the event vector for an executing program 104 can be compared to event vectors for known instances of malware. If the event vector matches a known instance of malware, then the executing program 104 may be designated as containing malware. As described above, the behavior analysis can be performed on the device or sent to another system (e.g., a cloud based system) for analysis.

After behavior analysis has been performed, the method returns to block 306 to receive events that can be used to determine an updated aggregated events fingerprint 110.

The event rate for a typical executing program can be hundreds of thousands of events per second. As noted above, the trigger event value can be tuned to control the frequency at which aggregated events are provided to a behavior analyzer 112. By tuning the trigger event value, a desired event rate can be achieved according to whether cloud based or device based behavior analysis is chosen.

Various modifications can be made in other embodiments. For example, the method of FIG. 3 does not take the order of the events into account. Total ordering is usually undesirable for behavior analysis, because slight variations can appear in different environments. However, ordering information can be helpful in behavior analysis. Thus, in some embodiments, shingling may be used to incorporate event order information into the behavior analysis. In shingling, the 'local' order of events can be captured using a ring buffer that keeps n past events, and the MinHash hashes the n events together instead of a single event. In some aspects, n can be a value of five or less. Using a value of five or less can keep the resource consumption of the method reasonable. However, the embodiments are not limited to any particular value for n.

In some embodiments, the event stream processing is advantageously asynchronous. The event is released and the process, which caused the event, continues its uninterrupted execution. Therefore, the system 100 can keep processes executing and the malware scanning is performed without being noticed by a system user.

Figure 4:
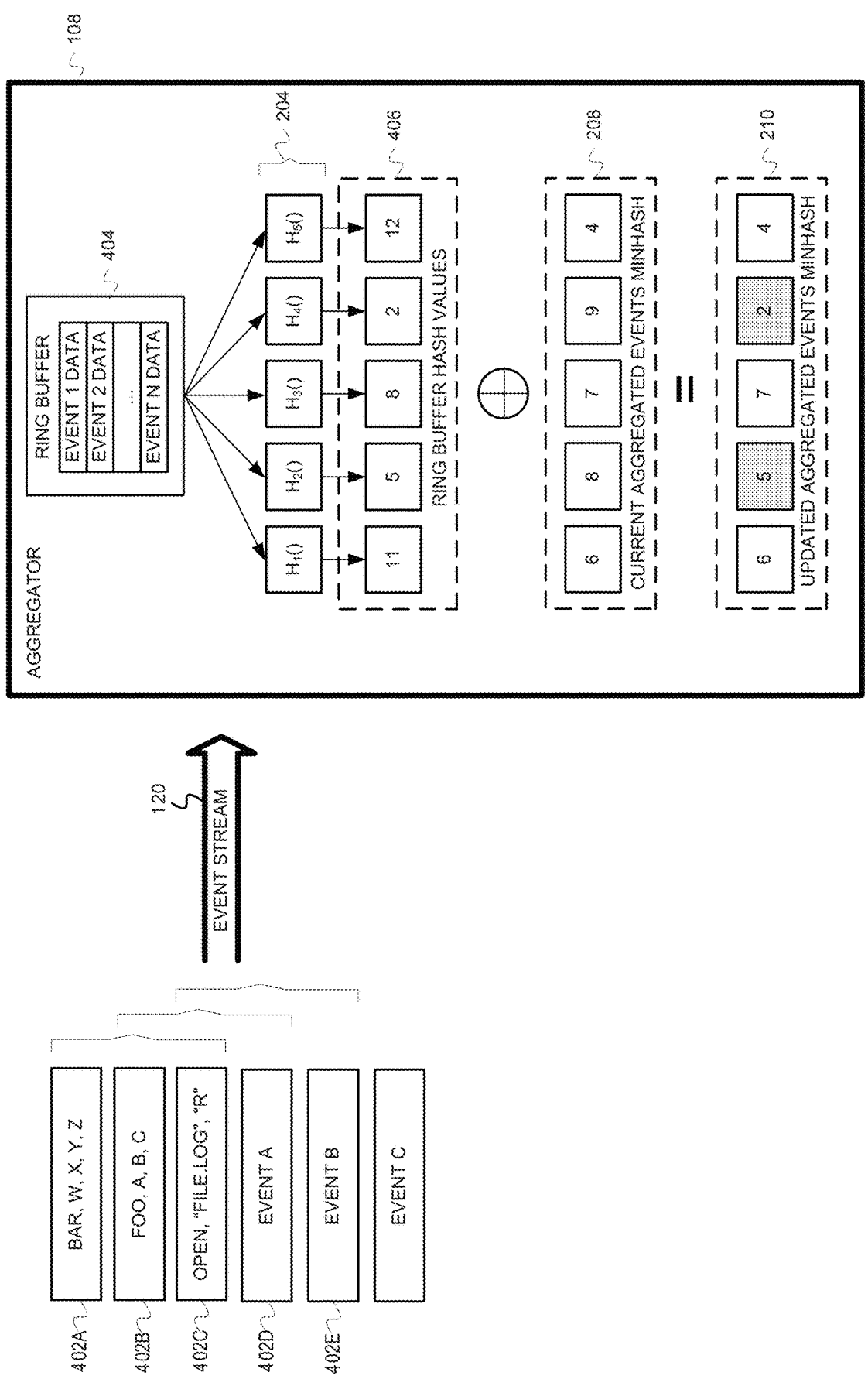
FIG. 4 is a block diagram illustrating events hashed together as a group or shingle to produce a hash value in accordance with one embodiment of the present invention.

FIG. 4 is a block diagram illustrating hash events of overlapping groups in accordance with one embodiment of the present invention. In particular, as shown in FIG. 4, a shingle value can be comprised with three (3) events. As events from event stream 120 are received, they can be placed in a ring buffer 404. The event data in ring buffer 404 can be hashed as a group. For example, events 402A, 402B and 402C can be hashed together as a group (i.e., a shingle) by K independent hash functions (K=5 in this example) to produce ring buffer hash values vector 406. The ring buffer hash values vector 406 can then be compared to the current aggregated events MinHash vector 208 to determine an updated aggregated events MinHash vector 210 in the same manner as described above with respect to FIG. 2. Similarly, events 402B, 402C and 402D can be hashed together as a group in a later iteration of the method and can produce a new updated aggregated events MinHash vector 210. Events 402C, 402D and 402E can be hashed together as a group in a further later iteration of the method to a further updated aggregated events MinHash vector 210. The process continues to hash the events in the event stream 120 in overlapping groups of n events until all events have been processed. This process is repeated for each of the K independent hash functions utilized by the MinHash algorithm. It will be appreciated that other quantities of events may be hashed together as a group or shingle.

In another embodiment of the present invention, MinHash restarting can be used. In the method illustrated in FIG. 2, when two applications use a similar set of functions, their respective aggregated event fingerprints may have a similarity after a certain time period (i.e., after they have both called most of the functions they need to use). To simulate a longer 'floating window' over the stream of events without storing all of them in memory (which could impact the performance) the method can accept a higher value in the update step of the MinHash if some condition is fulfilled, for example, the particular hash having few lower bits equal to 0. For example, the MinHash can be used to calculate K independent hashes from the current event datum and compares them with the K independent registers which it uses as internal state. If the special condition is fulfilled, then the register value is replaced with the new hash value regardless of whether the new hash value is smaller than the corresponding register value. If the special condition is not fulfilled, then the normal processing of MinHash takes place where if the new hash value is smaller than the number in the register, the new hash is stored to that register (only the corresponding hashes and registers are compared).

The above discussion has been presented in the context of detecting malware. It should be noted that the systems and methods described herein can be adapted for use in other contexts besides malware detection where it is desirable to compare two executable programs.

Figure 5:
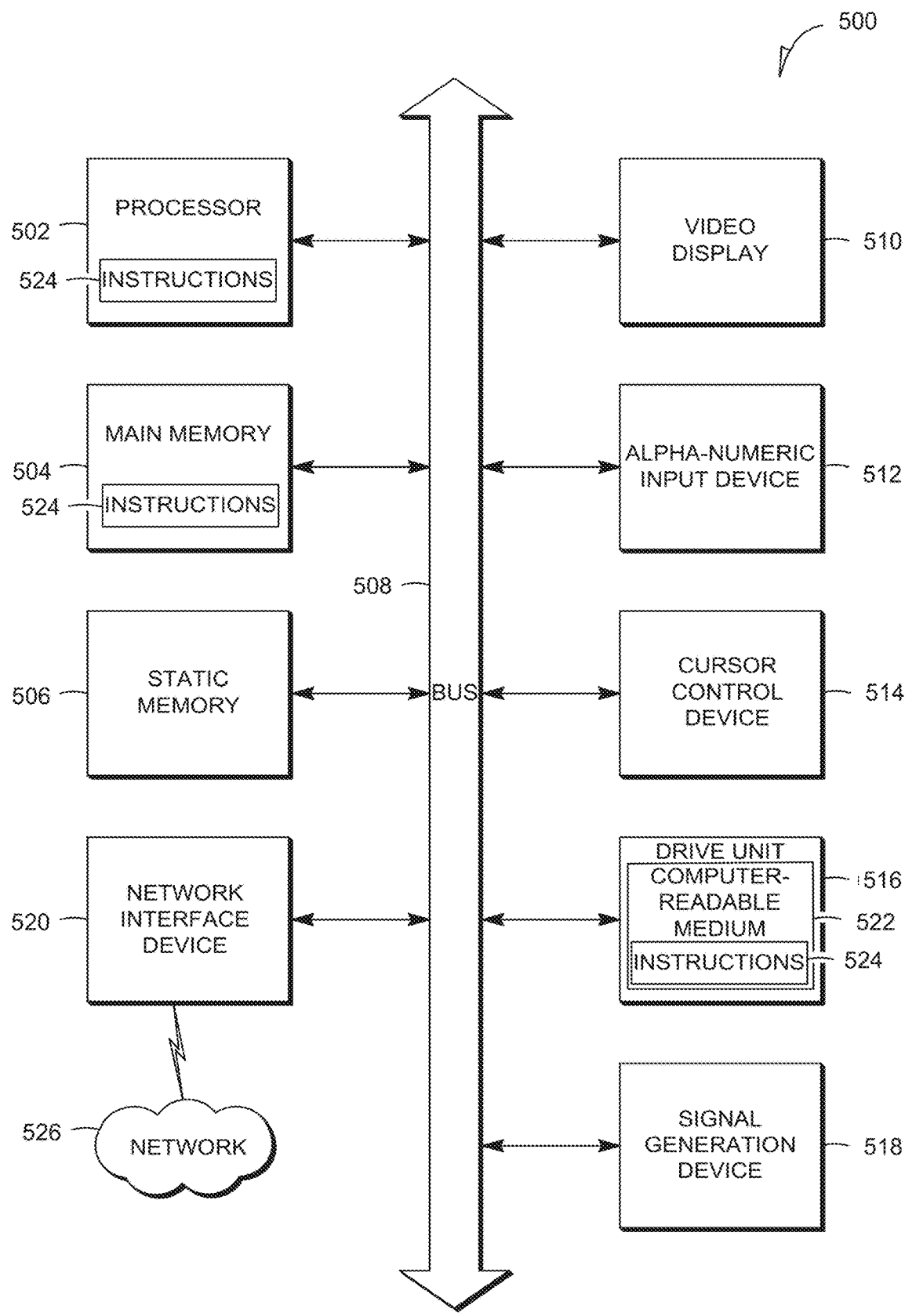
FIG. 5 is a block diagram of a computer system upon which embodiments of the inventive subject matter can execute in accordance with one embodiment of the present invention.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A computer-implemented method for detecting malware using a hash-based fingerprint for an executable program, the computer-implemented method comprising the steps of:
   executing the program on a computer system;
   monitoring an event stream for the program, the event stream comprising a plurality of events;
   calculating a first fingerprint, the first fingerprint calculated to represent a summary of the plurality of events in the event stream, wherein the first fingerprint comprises a plurality of hash values;
   in response to an occurrence of a trigger event, comparing the first fingerprint with one or more second fingerprints, wherein the trigger event occurs when one or more hash values of the plurality of hash values comprising the first fingerprint include at least one of a trigger value and a trigger pattern, and wherein the trigger value and the trigger pattern comprises a lowest four bits of at least one hash value of the plurality of hash values all being zero; and
   determining whether a behavior represented by the first fingerprint is a permitted behavior based, at least in part, on the comparison.

2. The computer-implemented method of claim 1 further comprising the step of:
   recalculating a new value for the first fingerprint in response to a new event being added to the event stream, the new value for the first fingerprint recalculated based, at least in part, on a current value of the first fingerprint and a plurality of hash values associated with the new event, wherein the first fingerprint comprises a fixed length fingerprint, wherein the fixed length is irrespective of a number of events in the event stream.

3. The computer-implemented method of claim 1, wherein the plurality of hash values are determined according to a MinHash hashing algorithm.

4. The computer-implemented method of claim 1, wherein the plurality of events comprises API (Application Program Interface) calls.

5. The computer-implemented method of claim 1, wherein the one or more second fingerprints represent one or more behaviors associated with known malware.

6. The computer-implemented method of claim 1, wherein the step of calculating the first fingerprint includes grouping events in the event stream into a plurality of overlapping groups, and wherein the first fingerprint is calculated based, at least in part, on a group of events.

7. A non-transitory computer readable storage medium having a program stored thereon, the program causing the computer to execute the steps of:
   executing an executable program on a computing device;
   observing an event stream for the executable program, the event stream comprising a plurality of events;
   generating a first fingerprint to represent a summary of the plurality of events in the event stream, wherein the first fingerprint comprises a plurality of hash values;

comparing the first fingerprint with one or more second fingerprints in response to a trigger event, wherein the trigger event occurs when one or more hash values of the plurality of hash values comprising the first fingerprint include at least one of a trigger value and a trigger pattern, and wherein the trigger value and the trigger pattern comprises a lowest four bits of at least one hash value of the plurality of hash values all being zero; and determining, based at least in part on the comparison, whether a behavior represented by the first fingerprint is a permitted behavior.

8. The non-transitory computer readable storage medium of claim 7, wherein the program further causes the computer to execute the step of:

regenerating a new value for the first fingerprint in response to a new event being added to the event stream, the new value for the first fingerprint regenerated based, at least in part, on a current value of the first fingerprint and a plurality of hash values associated with the new event, wherein the first fingerprint comprises a fixed length fingerprint wherein the fixed length is irrespective of a number of events in the event stream.

9. The non-transitory computer readable storage medium of claim 7, wherein the plurality of hash values are determined according to a MinHash hashing algorithm.

10. The non-transitory computer readable storage medium of claim 7, wherein the plurality of events comprises API (Application Program Interface) calls.

11. The non-transitory computer readable storage medium of claim 7, wherein the one or more second fingerprints are associated with one or more programs known to contain malware.

12. The non-transitory computer readable storage medium of claim 7, wherein the step of generating the first fingerprint includes grouping events in the event stream into a plurality of overlapping groups, and wherein the first fingerprint is calculated based on a group of events.

13. A system for detecting malicious software using a hash-based fingerprint, the system comprising:

a computing device to execute an executable program;

a monitoring module configured to monitor an event stream for the program, the event stream comprising a plurality of events;

an aggregating module configured to receive and process the plurality of events to generate a first fingerprint for the event stream, the first fingerprint generated to represent a summary of the plurality of events, wherein the first fingerprint comprises a plurality of hash values, wherein in response to a trigger event, the aggregating module provides the first fingerprint to a behavior analyzing module, wherein the trigger event occurs when one or more hash values of the plurality of hash values comprising the first fingerprint include at least one of a trigger value and a trigger pattern, and wherein the trigger value and the trigger pattern comprises a lowest four bits of at least one hash value of the plurality of hash values all being zero; and the behavior analyzing module configured to receive the first fingerprint for the event stream, compare the first fingerprint for the event stream with one or more second fingerprints, and determine, based on the comparison, whether a behavior represented by the first fingerprint is a permitted behavior.

14. The system of claim 13, wherein the aggregating module regenerates a new value for the first fingerprint in response to a new event being added to the event stream, the new value for the first fingerprint regenerated based, at least in part, on a current value of the first fingerprint and a plurality of hash values associated with the new event, wherein the first fingerprint comprises a fixed length fingerprint, wherein the fixed length is irrespective of a number of events in the event stream.

15. The system of claim 13, wherein the plurality of hash values are determined according to a MinHash hashing algorithm.

16. The system of claim 13, wherein the plurality of events comprises API (Application Program Interface) calls.

17. The system of claim 13, wherein the one or more second fingerprints are associated with one or more programs known to contain malware.

18. The system of claim 13, wherein the aggregating module is further configured to group the plurality of events in the event stream into a plurality of overlapping groups, and wherein the first fingerprint is generated based, at least in part, on a group of events.

19. A computer-implemented method for detecting malware using a hash-based fingerprint for an executable program, the computer-implemented method comprising the steps of:

executing the program on a computer system;

monitoring an event stream for the program, the event stream comprising a plurality of events;

calculating a first fingerprint, the first fingerprint calculated to represent a summary of the plurality of events in the event stream, wherein the first fingerprint comprises a plurality of hash values, wherein the plurality of hash values are determined according to a bMinHash hashing algorithm, and wherein a frequency of the trigger value and the trigger pattern is tunable by selecting a frequency feature of the bMinHash hashing algorithm;

in response to an occurrence of a trigger event, comparing the first fingerprint with one or more second fingerprints, wherein the trigger event occurs when one or more hash values of the plurality of hash values comprising the first fingerprint include at least one of a trigger value and a trigger pattern; and determining whether a behavior represented by the first fingerprint is a permitted behavior based, at least in part, on the comparison.

20. The computer-implemented method of claim 19 further comprising the step of: recalculating a new value for the first fingerprint in response to a new event being added to the event stream, the new value for the first fingerprint recalculated based, at least in part, on a current value of the first fingerprint and a plurality of hash values associated with the new event, wherein the first fingerprint comprises a fixed length fingerprint, wherein the fixed length is irrespective of a number of events in the event stream.

21. The computer-implemented method of claim 19, wherein the plurality of events comprises API (Application Program Interface) calls.

22. The computer-implemented method of claim 19, wherein the one or more second fingerprints represent one or more behaviors associated with known malware.

23. The computer-implemented method of claim 19, wherein the step of calculating the first fingerprint includes grouping events in the event stream into a plurality of overlapping groups, and wherein the first fingerprint is calculated based, at least in part, on a group of events.

24. A non-transitory computer readable storage medium having a program stored thereon, the program causing the computer to execute the steps of:

executing an executable program on a computing device;
observing an event stream for the executable program, the event stream comprising a plurality of events;
generating a first fingerprint to represent a summary of the plurality of events in the event stream, wherein the first fingerprint comprises a plurality of hash values, wherein the plurality of hash values are determined according to a bMinHash hashing algorithm, and wherein a frequency of the trigger value and the trigger pattern is tunable by selecting a frequency feature of the bMinHash hashing algorithm;
comparing the first fingerprint with one or more second fingerprints in response to a trigger event, wherein the trigger event occurs when one or more hash values of the plurality of hash values comprising the first fingerprint include at least one of a trigger value and a trigger pattern; and
determining, based at least in part on the comparison, whether a behavior represented by the first fingerprint is a permitted behavior.

25. The non-transitory computer readable storage medium of claim 24, wherein the program further causes the computer to execute the step of:
regenerating a new value for the first fingerprint in response to a new event being added to the event stream, the new value for the first fingerprint regenerated based, at least in part, on a current value of the first fingerprint and a plurality of hash values associated with the new event, wherein the first fingerprint comprises a fixed length fingerprint wherein the fixed length is irrespective of a number of events in the event stream.

26. The non-transitory computer readable storage medium of claim 24, wherein the plurality of events comprises API (Application Program Interface) calls.

27. The non-transitory computer readable storage medium of claim 24, wherein the one or more second fingerprints are associated with one or more programs known to contain malware.

28. The non-transitory computer readable storage medium of claim 24, wherein the step of generating the first fingerprint includes grouping events in the event stream into a plurality of overlapping groups, and wherein the first fingerprint is calculated based on a group of events.

29. A system for detecting malicious software using a hash-based fingerprint, the system comprising:

a computing device to execute an executable program;
a monitoring module configured to monitor an event stream for the program, the event stream comprising a plurality of events;
an aggregating module configured to receive and process the plurality of events to generate a first fingerprint for the event stream, the first fingerprint generated to represent a summary of the plurality of events, wherein the first fingerprint comprises a plurality of hash values, wherein the plurality of hash values are determined according to a bMinHash hashing algorithm, wherein a frequency of the trigger value and the trigger pattern is tunable by selecting a frequency feature of the bMinHash hashing algorithm, wherein in response to a trigger event, the aggregating module provides the first fingerprint to a behavior analyzing module, and wherein the trigger event occurs when one or more hash values of the plurality of hash values comprising the first fingerprint include at least one of a trigger value and a trigger pattern; and
the behavior analyzing module configured to receive the first fingerprint for the event stream, compare the first fingerprint for the event stream with one or more second fingerprints, and determine, based on the comparison, whether a behavior represented by the first fingerprint is a permitted behavior.

30. The system of claim 29, wherein the aggregating module regenerates a new value for the first fingerprint in response to a new event being added to the event stream, the new value for the first fingerprint regenerated based, at least in part, on a current value of the first fingerprint and a plurality of hash values associated with the new event, wherein the first fingerprint comprises a fixed length fingerprint, wherein the fixed length is irrespective of a number of events in the event stream.

31. The system of claim 29, wherein the plurality of events comprises API (Application Program Interface) calls.

32. The system of claim 29, wherein the one or more second fingerprints are associated with one or more programs known to contain malware.

33. The system of claim 29, wherein the aggregating module is further configured to group the plurality of events in the event stream into a plurality of overlapping groups, and wherein the first fingerprint is generated based, at least in part, on a group of events.

* * * * *